United States Patent
Kubo et al.

(10) Patent No.: US 6,686,961 B1
(45) Date of Patent: Feb. 3, 2004

(54) IMAGE PICKUP APPARATUS

(75) Inventors: Hiroaki Kubo, Muko (JP); Gen Sasaki, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/184,249

(22) Filed: Nov. 2, 1998

(65) Prior Publication Data
(65)

(30) Foreign Application Priority Data

| Nov. 7, 1997 | (JP) | ................................ 9-305298 |
| Nov. 10, 1997 | (JP) | ................................ 9-307301 |

(51) Int. Cl.$^7$ .......................... H04N 3/14; H04N 5/335
(52) U.S. Cl. ...................... 348/297; 348/296; 348/221.1
(58) Field of Search ................................ 348/222, 223, 348/272, 273, 275, 280, 296, 297, 244, 312, 229, 222.1, 246, 362, 364; 358/513, 516

(56) References Cited

U.S. PATENT DOCUMENTS

| 3,971,065 A | * | 7/1976 | Bayer .......................... 313/371 |
| 4,992,855 A | * | 2/1991 | Takei .......................... 348/226 |
| 5,298,981 A | * | 3/1994 | Topper et al. .............. 348/571 |
| 5,307,159 A | * | 4/1994 | Hieda .......................... 348/235 |
| 5,373,322 A | * | 12/1994 | Laroche et al. ............. 348/272 |
| 5,382,976 A | * | 1/1995 | Hibbard ...................... 348/266 |
| 5,459,510 A |   | 10/1995 | Hamalainen ................ 348/322 |
| 5,493,335 A | * | 2/1996 | Parulski et al. ............. 348/233 |
| 5,506,619 A | * | 4/1996 | Adams et al. ............... 348/266 |
| 5,555,022 A | * | 9/1996 | Haruki et al. ............... 348/223 |
| 5,652,621 A | * | 7/1997 | Adams et al. .............. 348/206 |
| 5,668,596 A | * | 9/1997 | Vogel .......................... 348/222 |
| 5,754,229 A |   | 5/1998 | Elabd ........................... 348/319 |
| 5,917,556 A | * | 6/1999 | Katayama .................... 348/223 |
| 6,366,318 B1 | * | 4/2002 | Smith et al. ................. 348/272 |

* cited by examiner

*Primary Examiner*—Andrew Christensen
*Assistant Examiner*—Eric Wisdahl
(74) *Attorney, Agent, or Firm*—Burns, Doane, Swecker & Mathis, LLP

(57) ABSTRACT

An image pickup apparatus has an image sensor having first-type, second-type, and third-type pixels each producing a signal corresponding to a first, a second, and a third color respectively. The pixels are arranged in a two-dimensional array consisting of first-type and second-type lines arranged alternately, with the first-type lines each composed of first-type and second-type pixels arranged alternately and the second-type lines each composed of first-type and third-type pixels arranged alternately. The image pickup apparatus also has a first subtracter for calculating the difference between the outputs of the first-type pixels and the outputs of the second-type pixels on the first-type lines, and a second subtracter for calculating the difference between the outputs of the first-type pixels and the output of the third-type pixels on the second-type lines. The image pickup apparatus further has a control circuit, which sets the read-operation clock signal of the image sensor at a lower rate during actual shooting than during previewing when the difference between the absolute values of the outputs of the first and second subtracters during previewing is equal to or greater than a predetermined value.

15 Claims, 12 Drawing Sheets

FIG. 1
PRIOR ART

| G | R | G | R | G |
|---|---|---|---|---|
| B | G | B | G | B |
| G | R | G | R | G |
| B | G | B | G | B |
| G | R | G | R | G |

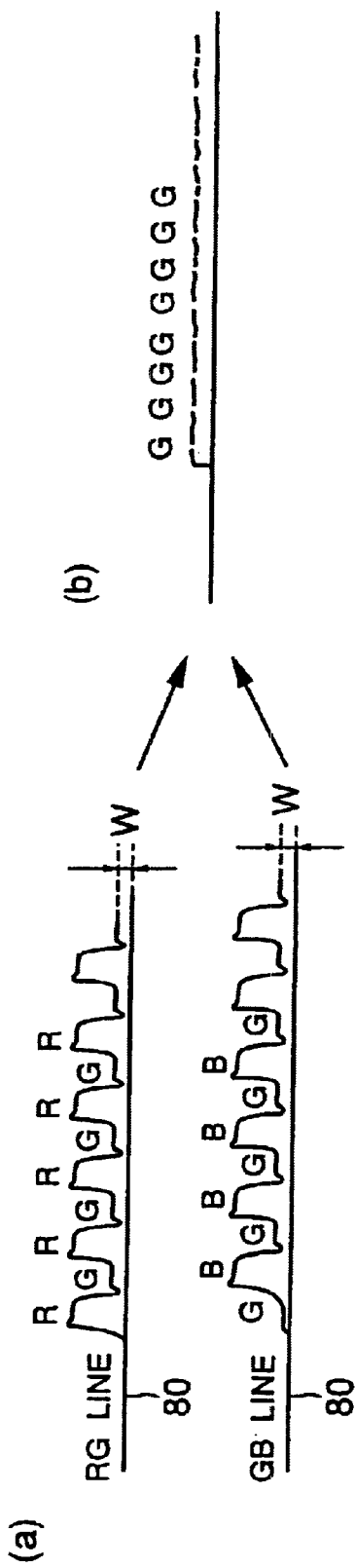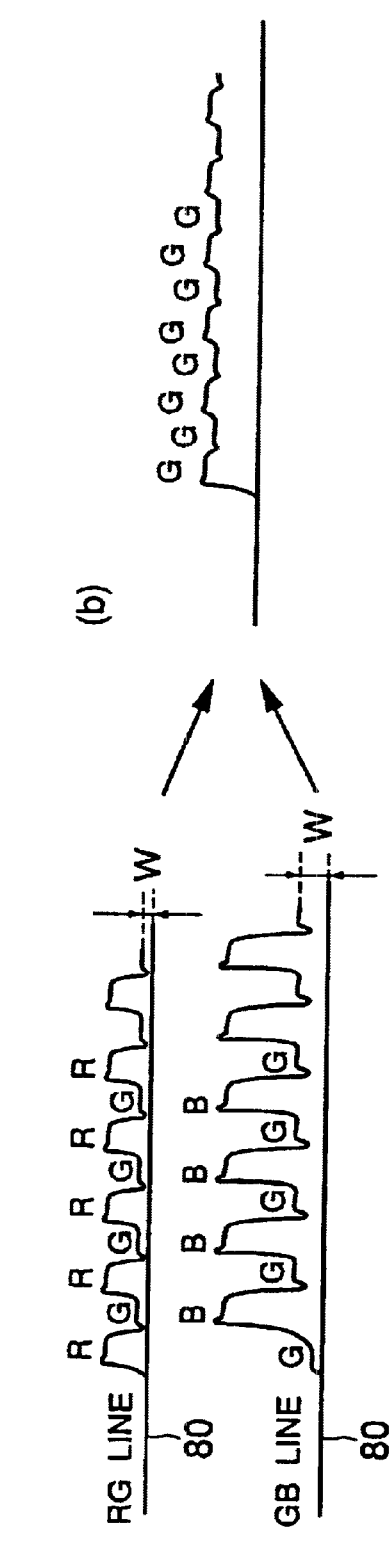
FIG. 2A PRIOR ART
FIG. 2B PRIOR ART

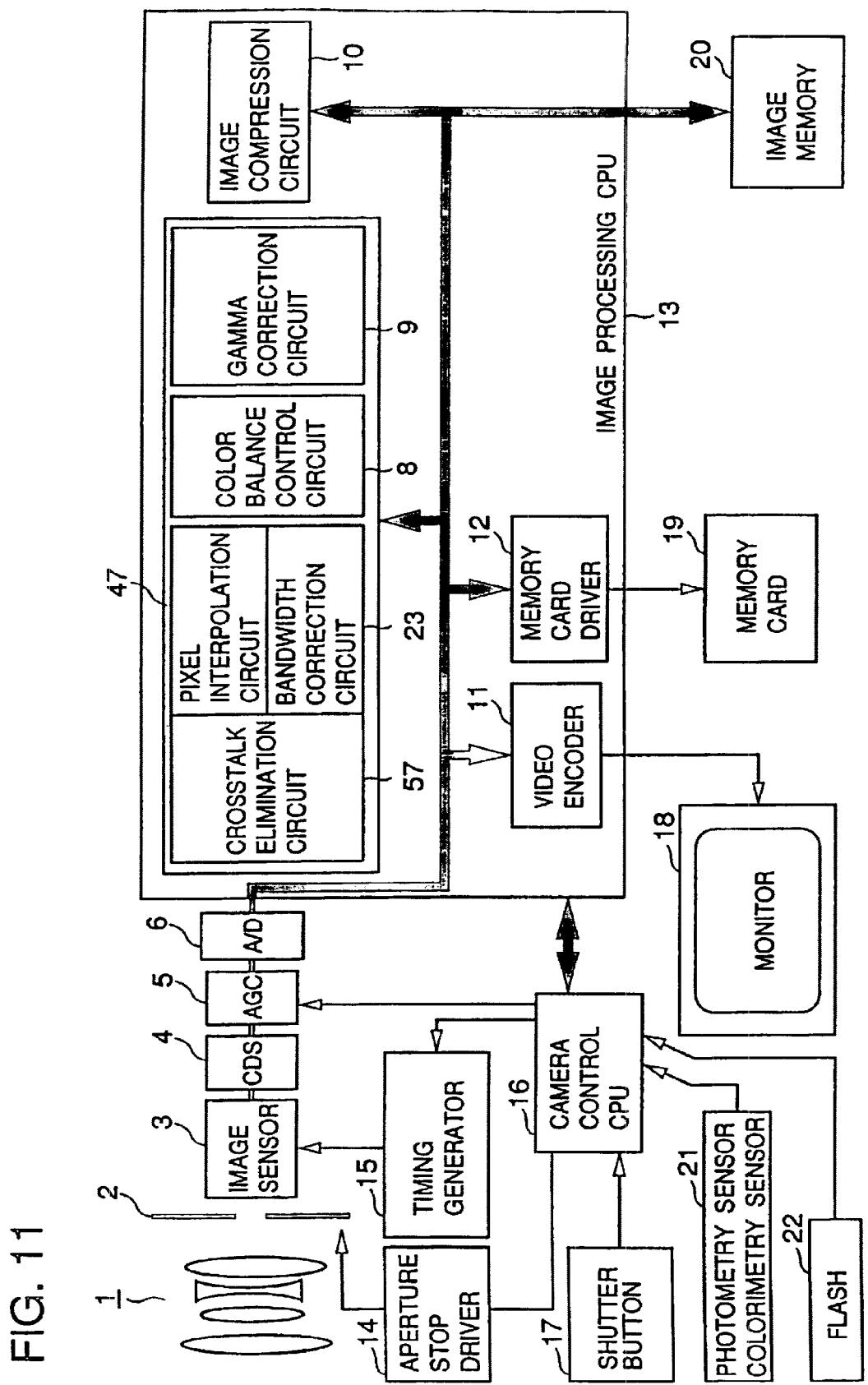

IMAGE PICKUP APPARATUS

This application is based on applications Nos. H09-305298 and H09-307301 filed in Japan, the content of which is hereby incorporated by reference.

BACKGROUND OF THE INVENTION

1. Field of the Invention

The present invention relates to an image pickup apparatus that employs as an image pickup device an image sensor of the type in which each pixel (picture element) generates a signal that corresponds to one of three primary colors.

2. Description of the Prior Art

In an image pickup apparatus, it is inevitable that the obtained image signals contain noise for various reasons, and therefore, to obtain cleanest images possible, it is essential to remove such noise. In an image pickup apparatus that employs as an image pickup device an image sensor of the type in which adjacent pixels generate signals corresponding to different colors, the most significant cause of noise is crosstalk between adjacent pixels. The principle of how noise is caused by crosstalk is as follows.

When, in an analog signal processing circuit, there is a difference between the levels of the image signals output from adjacent pixels that are read out consecutively, the image signals affect each other, causing their levels to deviate from their original levels. This phenomenon is referred to as "crosstalk" in the present specification. Crosstalk increases as the signal level difference between adjacent pixels is greater.

Thus, the effect of crosstalk varies as the difference between the levels of the image signals output from adjacent pixels varies, and this is the cause of what is referred to as "noise due to crosstalk".

Now, with reference to FIGS. 1, 2A, and 2B, how noise due to crosstalk arises will be described specifically. FIG. 1 illustrates a mosaic filter as is typically bonded over the image-sensing surface of an image sensor. In this mosaic filter, filter elements for each of three primary colors, i.e. green (G), blue (B), and red (R), are arranged alternately in a two-dimensional array. When regarded as being composed of horizontal lines, the array is composed of RG lines (each composed of R and G pixels arranged alternately) and GB lines (each composed of G and B pixels arranged alternately) arranged alternately. The G pixels are arranged in a checkered pattern. In this image sensor, each pixel generates a signal corresponding to the color of the filter that is placed over that pixel. The electric charges occurring in the individual pixels of the image sensor are read out successively along one horizontal line after another, i.e. along the RG and GB lines alternately. This type of primary color filter tends to cause a large difference in the level of the image signal in particular between adjacent pixels, and thus tends to cause crosstalk.

When the image signals obtained along two consecutive RG and GB lines have waveforms as shown at (a) in FIG. 2A, the signal level difference between adjacent pixels is almost equal on the RG line and on the GB line, and therefore the G pixels are affected by crosstalk to an almost equal degree on these two lines. Thus, the deviation W of the levels of the G-pixel signals from the black level 80 is almost equal on these two lines. Interpolating the G pixels of each of these two lines by using the average of adjacent pixels yields a waveform as shown at (b) of FIG. 2A.

On the other hand, when the signal level difference between adjacent pixels on the RG line differs greatly from that on the GB line, and the image signals obtained along those two lines have waveforms as shown at (a) in FIG. 2B, the G pixels are affected by crosstalk to different degrees on those two lines. That is, on the GB line, where there is a large signal level difference between adjacent pixels, the G pixels are affected greatly by crosstalk from the B, pixels, and thus the level of the G-pixel signals is shifted upward, with its deviation W from the black level 80 increased. By contrast, on the RG line, the deviation W of the signal level of the G pixels is smaller than on the GB line.

In this case, interpolating the G pixels of each of the two lines by using the average of adjacent pixels, i.e. interpolating the portions occupied by the signals of the R (in the case of the RG line) or B (in the case of the GB line) pixels existing between the G pixels with the signals of appropriate G pixels (for example, with the average of the G pixels that are vertically adjacent to those R or B pixels and thus belong to the upper and lower adjacent lines), yields a waveform as shown at (b) in FIG. 2B, which indicates that the G-pixel signals as a whole suffer from dot-shaped noise. This noise is one type of noise that results from crosstalk.

Even in cases where the G pixels are not interpolated, there exists a difference in the signal level of the G pixels between the RG and GB lines (although no such difference should exist except at a border between different colors). Accordingly, when, for example, the image signals obtained from the signals shown in FIG. 2B are fed to a display, the image displayed thereon suffers from noise that appears as a pattern of alternating deeply and lightly colored lines. This noise is another type of noise that results from crosstalk.

One conventional way to avoid such noise is to reduce the color modulation factor of the entire image by filtering. This helps reduce the difference between the signal levels of adjacent pixels and thereby reduce the effect of crosstalk. This in turn leads to reduction of the noise that results from, variation in the effect of crosstalk and that is included in the image signals obtained after interpolation.

However, this method, although effective in preventing noise, cannot be adopted without degrading the definition of the entire image. Reducing the resolution of the image is considered to be another way to reduce the effect of crosstalk and thereby reduce noise.

As described above, it has conventionally been impossible to eliminate noise due to crosstalk without sacrificing the resolution and definition of the obtained image. Oil the other hand, using high-performance circuits that offer satisfactory high-frequency response helps reduce the effect of crosstalk, but this requires unduly high extra cost.

SUMMARY OF THE INVENTION

An object of the present invention is to provide an image pickup apparatus that can eliminate noise due to crosstalk without unduly degrading color rendering, without sacrificing resolution, and without requiring unduly high cost.

To achieve the above object, according to one aspect of the present invention, an image pickup apparatus is provided with: an image sensor having first-type, second-type, and third-type pixels each producing a signal corresponding to a first, a second, and a third color respectively, the pixels being arranged in a two-dimensional array consisting of first-type lines and second-type lines arranged alternately, the first-type lines each consisting of first-type and second-type pixels arranged alternately, the second-type lines each consisting of first-type and third-type pixels arranged alternately; a first subtracter for calculating a difference between the outputs of the first-type pixels and the outputs of the second-type pixels on the first-type lines; a second subtracter for calculating a difference between the outputs of the first-type pixels and the outputs of the third-type pixels on the second-type lines; and a control circuit for driving the image sensor in accordance with the outputs of the first and second subtracters.

According to another aspect of the present invention, an image pickup apparatus is provided with: an image sensor having first-type, second-type, and third-type pixels each producing a signal corresponding to a first, a second, and a third color respectively, the pixels being arranged in a two-dimensional array consisting of first-type lines and second-type lines arranged alternately, the first-type lines each consisting of first-type and second-type pixels arranged alternately, the second-type lines each consisting of first-type and third-type pixels arranged alternately; a color temperature detecting circuit for detecting the color temperature of the light coming from an object to be shot; and a control circuit for driving the image sensor in accordance with the output of the color temperature detecting circuit.

According to still another aspect of the present invention, in a method of reproducing an image, an image sensor is used that has first-type, second-type, and third-type pixels each producing a signal corresponding to a first, a second, and a third color respectively. In this image sensor, the pixels are arranged in a two-dimensional array consisting of first-type lines and second-type lines arranged alternately, with the first-type lines each composed of first-type and second-type pixels arranged alternately and the second-type lines each composed of first-type and third-type pixels arranged alternately. Moreover, this method includes the steps of: calculating the difference between the outputs of the first-type pixels and the outputs of the second-type pixels on the first-type lines; calculating the difference between the outputs of the first-type pixels and the outputs of the third-type pixels on the second-type lines; and driving the image sensor in accordance with the calculated two differences.

According to a further aspect of the present invention, an image pickup apparatus is provided with: an image sensor having first-type, second-type, and third-type pixels each producing a signal corresponding to a first, a second, and a third color respectively, the pixels being arranged in a two-dimensional array consisting of first-type lines and second-type lines arranged alternately, the first-type lines each consisting of first-type and second-type pixels arranged alternately, the second-type lines each consisting of first-type and third-type pixels arranged alternately; a first subtracter for calculating a difference between the outputs of the first-type pixels and the outputs of the second-type pixels on the first-type lines; a second subtracter for calculating a difference between the outputs of the first-type pixels and the outputs of the third-type pixels on the second-type lines; and a correction circuit for correcting the outputs of the first-type pixels in accordance with the outputs of the first and second subtracters.

BRIEF DESCRIPTION OF THE DRAWINGS

This and other objects and features of the present invention will become clear from the following description, taken in conjunction with the preferred embodiments with reference to the accompanied drawings in which:

FIG. 1 is a diagram illustrating a mosaic filter as is typically bonded over the image-sensing surface of an image sensor;

FIG. 2A is a diagram illustrating how crosstalk causes noise (showing a case where no noise occurs);

FIG. 2B is another diagram illustrating how crosstalk causes noise (showing a case where noise occurs);

FIG. 11 is a block diagram illustrating the structure of an image pickup apparatus of a second embodiment of the present invention;

DESCRIPTION OF THE PREFERRED EMBODIMENTS

Hereinafter, image pickup apparatuses embodying the present invention will be described with reference to the drawings.

First Embodiment

Figure 1:
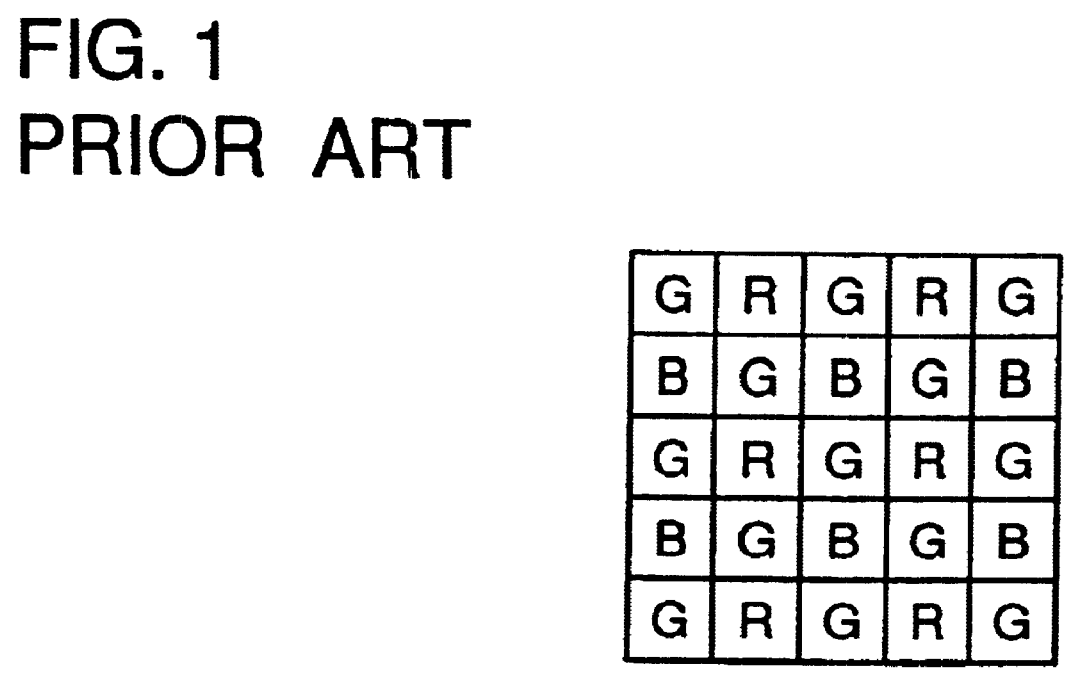
Figure 3:
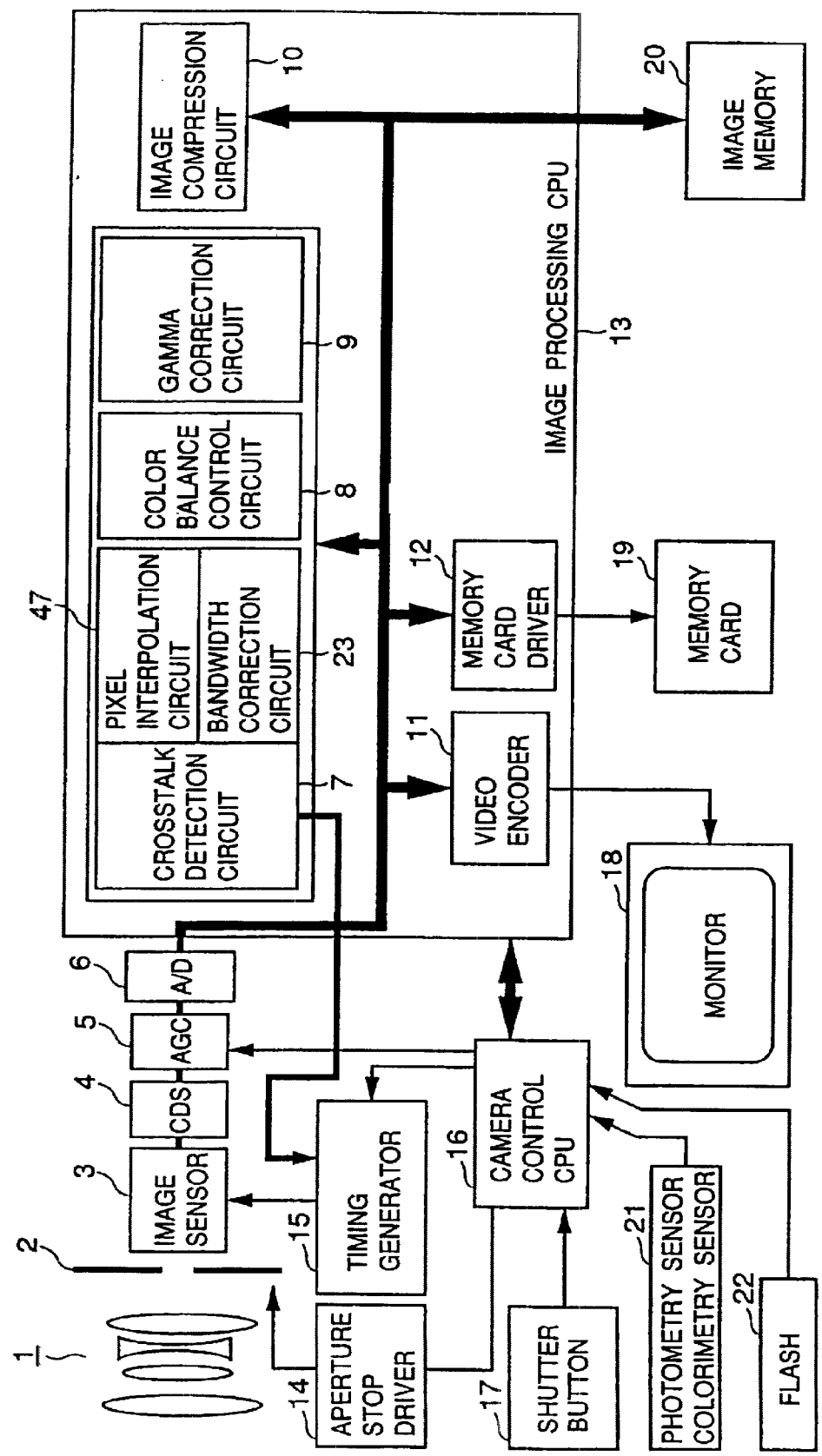
FIG. 3 is a block diagram illustrating the structure of the image pickup apparatus of a first embodiment of the present invention.

FIG. 3 is a block diagram illustrating the structure of the image pickup apparatus of a first embodiment of the present invention. The light incoming through a taking lens 1 is first subjected to light-amount control performed by an optical aperture stop 2, and is then focused on an image sensor 3 to form an image thereon. A flash 22 may be activated depending on the amount of the light coming from the object. The image sensor 3 is composed of an area sensor of a type that reads out its pixels along one horizontal line after another, and has a mosaic filter of the same type as shown in FIG. 1 bonded over its image-sensing surface. The filter is fitted over the image sensor 3 in such a way that each of the smallest elements (R, G, or B) of the filter is placed over each pixel of the image sensor 3. In the following descriptions, those pixels of the image sensor 3 over which R, G, or B elements of the filter are placed will be referred to as R, G, or B pixels respectively.

The aperture value of the aperture stop 2 and the accumulation time (i.e. the electronic shutter speed) of the image sensor 3, which are together referred to as the exposure control data, are calculated by a camera control CPU 16 in accordance with the light amount measured by a photometry sensor 21. In accordance with the calculated exposure control data, the camera control CPU 16 controls an aperture stop driver 14 and a timing generator 15 so that appropriate exposure will be achieved on the image sensor 3. The aperture stop driver 14 controls the aperture value of the aperture stop 2. The timing generator 15 controls the accumulation time of the image sensor 3, and in addition feeds the image sensor 3 with a clock signal that determines the timing with which electric charges are read out from the image sensor 3.

The image sensor 3 performs photoelectric conversion and outputs an image signal, which is then subjected to sampling performed by a CDS 4 to remove noise caused by reset pulses. Thereafter, the image signal is subjected to sensitivity correction performed by an AGC (automatic gain control) circuit 5, is converted from an analog signal to a digital signal by an A/D (analog-to-digital) converter 6, and is then fed to an image processing CPU 13. In synchronism with the reading-out of the electric charges from the image sensor 3, the image signal is written to an image memory 20. The operations described hereafter are performed by accessing the image data thus stored in the image memory 20.

The image data stored in the image memory 20 is subjected to various kinds of image processing performed by a pixel interpolation circuit 47, a bandwidth correction circuit 23, a color balance control circuit 8, and a gamma correction circuit 9, and is then written back to the image memory 20. On the other hand, using the image data stored in the image memory 20 during previewing, a crosstalk detection circuit 7 predicts whether noise exceeding a permissible level will occur or not, and, in accordance with this prediction, the frequency of the clock signal of the image sensor 3 during actual shooting is controlled.

Every time the data of an image is written to the image memory 20, the image data is subjected to image processing performed by the pixel interpolation circuit 47, the bandwidth correction circuit 23, the color balance control circuit 8, and the gamma correction circuit 9, and is then written back to the image memory 20. By contrast, the detection by the crosstalk detection circuit 7 is performed only on the image data obtained during previewing. Thus, image data obtained during previewing is subjected to both image processing and crosstalk detection, of which either may be performed first, or both may be performed concurrently.

Figure 4:
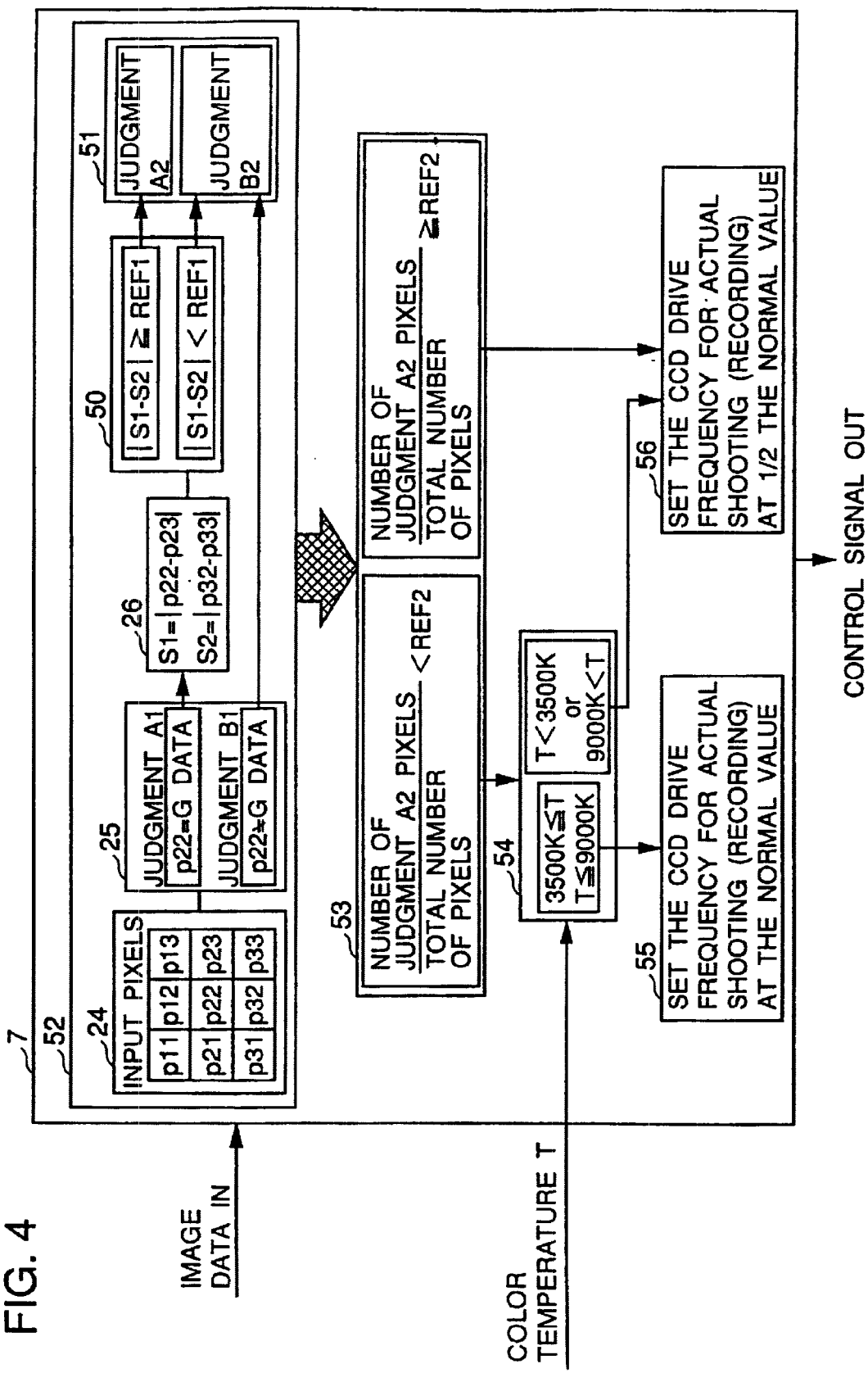
FIG. 4 is a flow chart illustrating the control performed by the crosstalk detection circuit.

A description will now be given of the detection performed by the crosstalk detection circuit 7. FIG. 4 is a flow chart illustrating the control performed by the crosstalk detection circuit 7. First, in a data input step 24, the crosstalk detection circuit 7 receives the data of one pixel (called the target pixel), together with the data of the eight pixels surrounding the target pixel, i.e., in total, the data of a set of 3×3 pixels including the target pixel at the center. Next, in a G-pixel extraction step 25, whether the data p22 of the central pixel is G-pixel data or not is checked.

If the data p22 is found not to be G-pixel data (judgment B1), then, in a second judgment step 51, the central pixel is judged to deserve judgment B2. By contrast, if the data p22 is found to be G-pixel data (judgment A1), then the control proceeds to a modulation factor calculation step 26, where the signal level differences S1 and S2 between adjacent pixels are calculated. Here, it is supposed that S1=|p22−p23| and S2=|p32−p33|.

Figure 5:
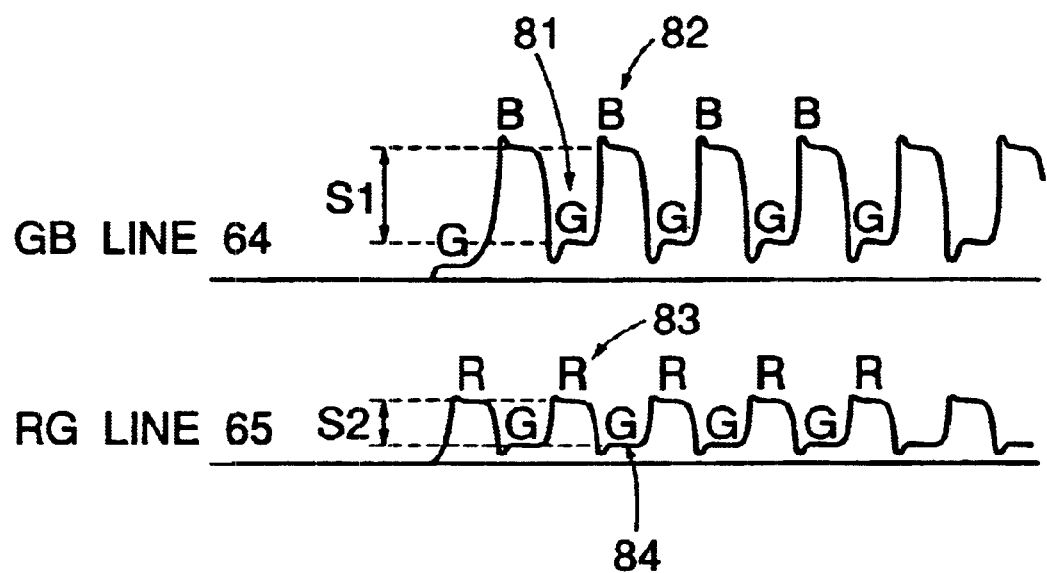
FIG. 5 is a diagram showing an example of image data illustrating the control performed by the crosstalk detection circuit.

For example, suppose that the data p22 represents: the signal level of a G pixel 81 on a GB line 64 as shown in FIG. 5, and that the data p23, p32, and p33 respectively represent a B pixel 82 on the GB line 64 and an R pixel 83 and a G pixel 84 on an RG line 65. Then, as shown in FIG. 5, S1 represents the signal level difference between the G pixel 81 and the B pixel 82, and S2 represents the signal level difference between the R pixel 83 and the G pixel 84.

Back in FIG. 4, in the embodiment under discussion, the means used to calculate S1 is called a first subtracting means, and the means used to calculate S2 is called a second subtracting means. After the calculation of S1 and S2, the control proceeds to a first judgment step 50, where a crosstalk reference level REF1 is previously set so that the central pixel can be classified depending on the values of S1 and S2. If |S1−S2|≧REF1, then, in the second judgment step 51, the central pixel is judged to deserve judgment A2; if |S1−S2|<REF1, then, in the second judgment step 51, the central pixel is judged to deserve judgment B2. These steps 24, 25, 26, 50, and 51 constitute a sequence 52 for checking a pixel, and this sequence is repeated successively for one pixel after another until all the pixels have been judged to deserve judgment A2 or B2.

On completion of the sequence 52 for all the pixels, then, in a third judgment step 53, whether the value of the number of pixels deserving judgment A2 divided by the total number of pixels is smaller than a previously set reference value REF2 or whether that value is equal to or greater than the reference value REF2 is checked. Note that the total number of pixels equals to the sum of the number of pixels deserving judgment A2 and the number of pixels deserving judgment B2. If the value is found to be equal to or greater than REF2, then, in a second transmission step 56, a control signal is transmitted that sets the driving frequency (i.e. the frequency of the read-operation clock signal) at which the image sensor 3 is driven during actual shooting (i.e. recording) at half the normal value (i.e. half the frequency used during preview). Note that any control signal, like this one, that sets the driving frequency of the image sensor 3 is transmitted to the timing generator 15. In accordance with this control signal, the timing generator 15 feeds the image sensor 3 with an appropriate read-operation clock signal.

If, in the third judgment step 53, the value is found to be smaller than REF2, then the control proceeds to a fourth judgment step 54. Here, the crosstalk detection circuit 7 receives data on the color temperature T, which is calculated by and transmitted from the camera control CPU 16. The camera control CPU 16 calculates the color temperature T on the basis of the R/G and B/G data of the entire light from the object as detected by a colorimetry sensor 21.

In the fourth judgment step 54, if T<3,500 K or 9,000 K<T, then just as in the case described just above, in the second transmission step 56, a control signal is transmitted that sets the driving frequency at which the image sensor 3 is driven during actual shooting (i.e. recording) at half the normal value. If 3,500 K≦T≦9,000 K, then, in a first transmission step 55, the driving frequency at which the image sensor 3 is driven during actual shooting (i.e. recording) is set to be equal to the normal value, i.e. the same value as during previewing, and a corresponding control signal is transmitted to the timing generator 15.

When T<3,500 K or 9,000 K<T, the light from the object has a color temperature that is greatly deviated from color temperatures typically obtained under normal shooting conditions, that is, the light from the object has so great a color modulation factor that noise due to crosstalk is inevitable. In the embodiment under discussion, fulfilling the condition as noted above in the fourth judgment step 54 helps prevent such noise.

By reducing the rate at which the image sensor 3 performs read operations, it is possible to enhance the response of the related circuits (the image sensor 3, the CDS 4, the AGC circuit 5, and the A/D converter 6) and thereby reduce the effect of crosstalk. As the effect of crosstalk is reduced, the deviations from the original signal levels are reduced on all lines. As a result, there arises little difference in the effect of crosstalk between lines, and therefore no (or almost no) noise results from crosstalk.

Figure 6A:
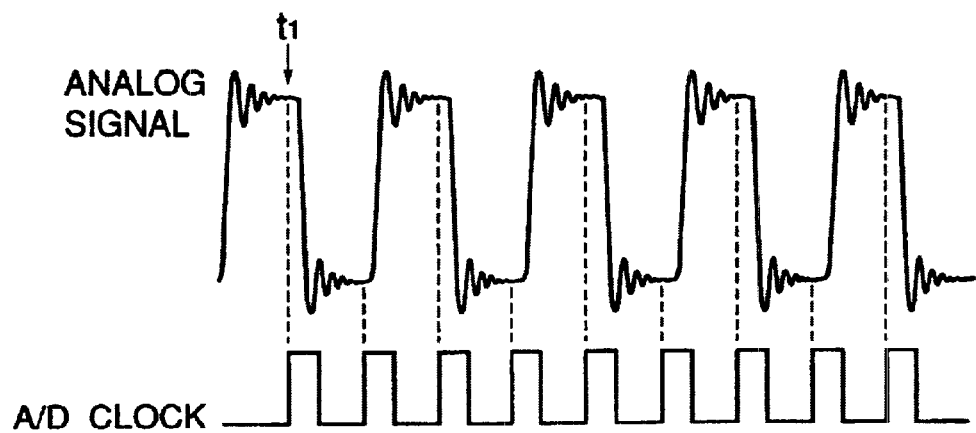
FIG. 6A is a diagram showing an analog signal illustrating how high-frequency noise occurs differently depending on the read-operation clock of the image sensor (when the read-operation clock has a normal rate)
Figure 6B:
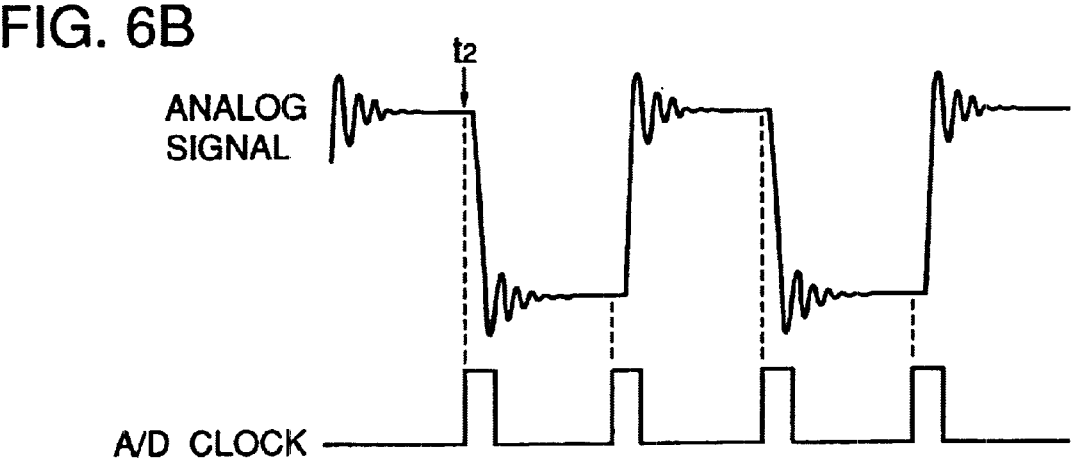
FIG. 6B is a diagram showing an analog signal illustrating how high-frequency noise occurs differently depending on the read-operation clock of the image sensor (when the read-operation clock has half the normal rate)

Moreover, by reducing the rate at which the image sensor 3 performs read operations, it is possible to eliminate high-frequency noise (i.e. improve the S/N (signal-to-noise) ratio) as well. The principle of how high-frequency noise is eliminated will now be described with reference to FIGS. 6A and 6B. FIGS. 6A and 6B each show the analog signal and the A/D clock signal fed to the A/D converter 6. FIG. 6A illustrates the case where the driving frequency of the image sensor 3 is set at the normal value (i.e. during previewing), and FIG. 6B illustrates the case where it is set at half the normal value.

As shown in FIG. 6A, when the driving frequency is set at the normal value, sampling takes place immediately after the modulation of the analog signal, that is, before high-frequency noise subsides (for example at the time $t_1$). As a result, the sampled signal is affected by the noise. By contrast, as shown in FIG. 6B, when the driving frequency is set at half the normal value, sampling takes place a little while after the modulation of the analog signal, that is, after high-frequency noise has subsided (for example at the time $t_2$). As a result, the sampled signal is not affected by the noise.

In this way, when the driving frequency of the image sensor 3 is set at half the normal value, it is possible to eliminate not only noise due to crosstalk, but also high-frequency noise.

Figure 7:
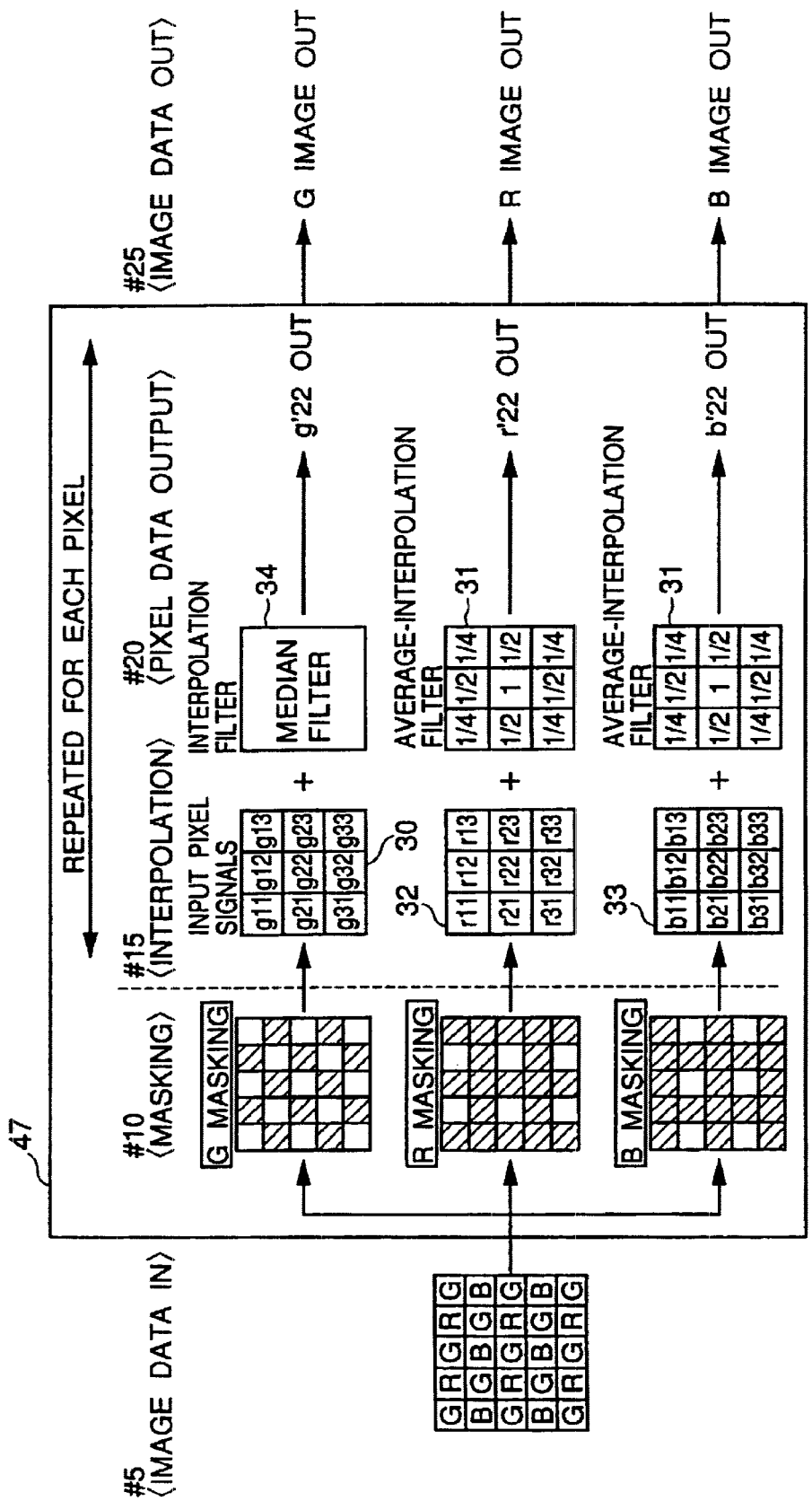
FIG. 7 is a flow chart illustrating the procedure performed by the pixel interpolation circuit.

Next, a description will be given of image processing. First, the pixel interpolation circuit 47 performs pixel interpolation. Pixel interpolation refers to the process of forming a complete image for each of R, G, and B colors by filling all pixels by using one type of signals, i.e. R, G, or B signals respectively, that are available only discontinuously. As a result of this pixel interpolation, three sets of image data, i.e. R, G, and B images, are produced from the data of a single image. FIG. 7 is a flow chart of the procedure performed by the pixel interpolation circuit 47.

First, in step #5, the pixel interpolation circuit 47 receives image data. Then, in step #10, the image data is subjected to G-, R-, and B-masking separately. G-, R-, or B-masking refers to the process of reducing to 0 (zero) the signals other than those of G, R, or B pixels respectively. After masking, in step #15, interpolation is performed. Interpolation is performed individually for each pixel. First, for one pixel (called the target pixel), the signals of the 3×3 pixels including the target pixel at the center are read out, and those signals are processed by the use of interpolation filters.

The G-pixel signals are processed by the use of a median filter 34. Within the 3×3 pixels read out, the median filter 34 takes the average of the two midmost values among the signal values of the four pixels adjacent to (i.e. directly above, below, on the right of, and on the left of) the central pixel, adds the calculated average to the signal value of the central pixel, and uses the obtained value as the new signal value of the central pixel after interpolation.

Specifically, suppose that, in FIG. 7, reference numeral 30 represents the signals of the 3×3 pixels read out, with the values inside representing the signal values of the individual pixels. Then, after processing by the use of the median filter 34, g'22=(the average of the two midmost values among the signal values g12, g21, g23, and g32)+g22. In step #20, the value of $g'2^2$ is output as the signal value of the central pixel of the 3×3 pixels after interpolation.

Interpolation of the R-pixel and B-pixel signals are processed by the use of average-interpolation filters 31 (in step #15). For example, the R-pixel signals are processed in the following manner (the B-pixel signals are processed in the same manner). Within the 3×3 pixels read out, all the signal values are added up with predetermined weights equal to the values of the corresponding pixels of the average-interpolation filter 31 given to the individual signal values. Specifically, suppose that, in FIG. 7, reference numeral 32 represents the signals of the 3×3 pixels read out, with the values inside representing the signal values of the individual pixels. Then, r'22=1/4×r11+1/2×r12+1/4×r13+1/2×r21+r22+1/2×r23+1/4×r31+1/2×r32+1/4×r33.

The above-described processing for interpolation is repeated for each of the pixels of each of the images obtained after masking. Thus, in step #25, three sets of image data (i.e. three images) after interpolation are output. These sets of image data are then subjected to bandwidth correction performed by the bandwidth correction circuit 23. Bandwidth correction refers to the process of compensating for the degradation of output response at higher frequencies due to the frequency response of the related circuits.

Figure 8:
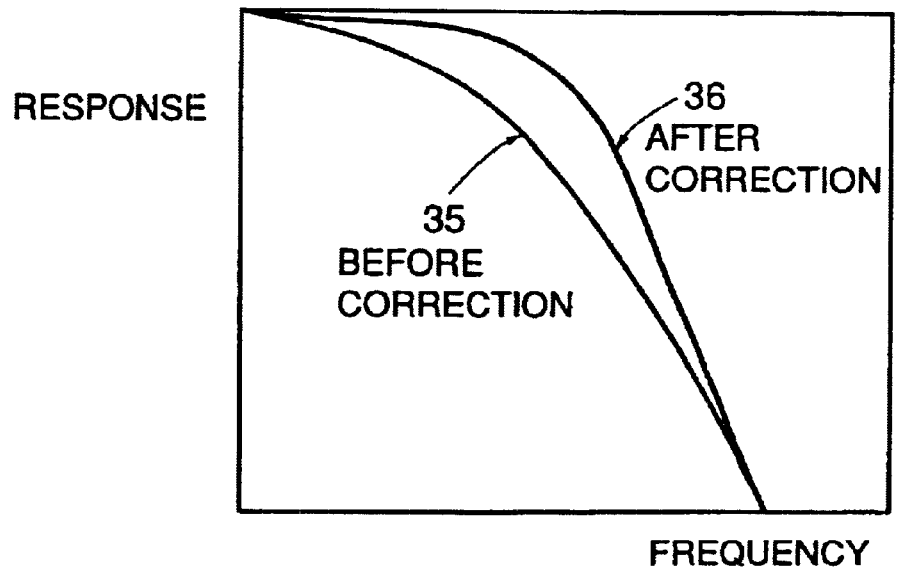
FIG. 8 is a diagram illustrating the frequency response before and after the correction of the bandwidth of image data.

The principle of bandwidth correction will now be described with reference to FIG. 8. Unless processed specially, the image data exhibits degradation of output response at higher frequencies as indicated by the curve 35; this is due to the frequency response of the related circuits. To obtain clean images, output frequency response should ideally be as flat as possible over the entire range of frequencies used. In the embodiment under discussion, bandwidth correction eventually serves to optimize output frequency response.

As a result of this bandwidth correction, the curve 35 is corrected, for example, as indicated by the curve 36. In this embodiment, bandwidth correction is performed only on the G image. On the other hand, to the R and B images, which contain only low-frequency components as opposed to the G image, the mid- to high-frequency components of the G image are added in order to obtain clean images with sharp edges.

Figure 9:
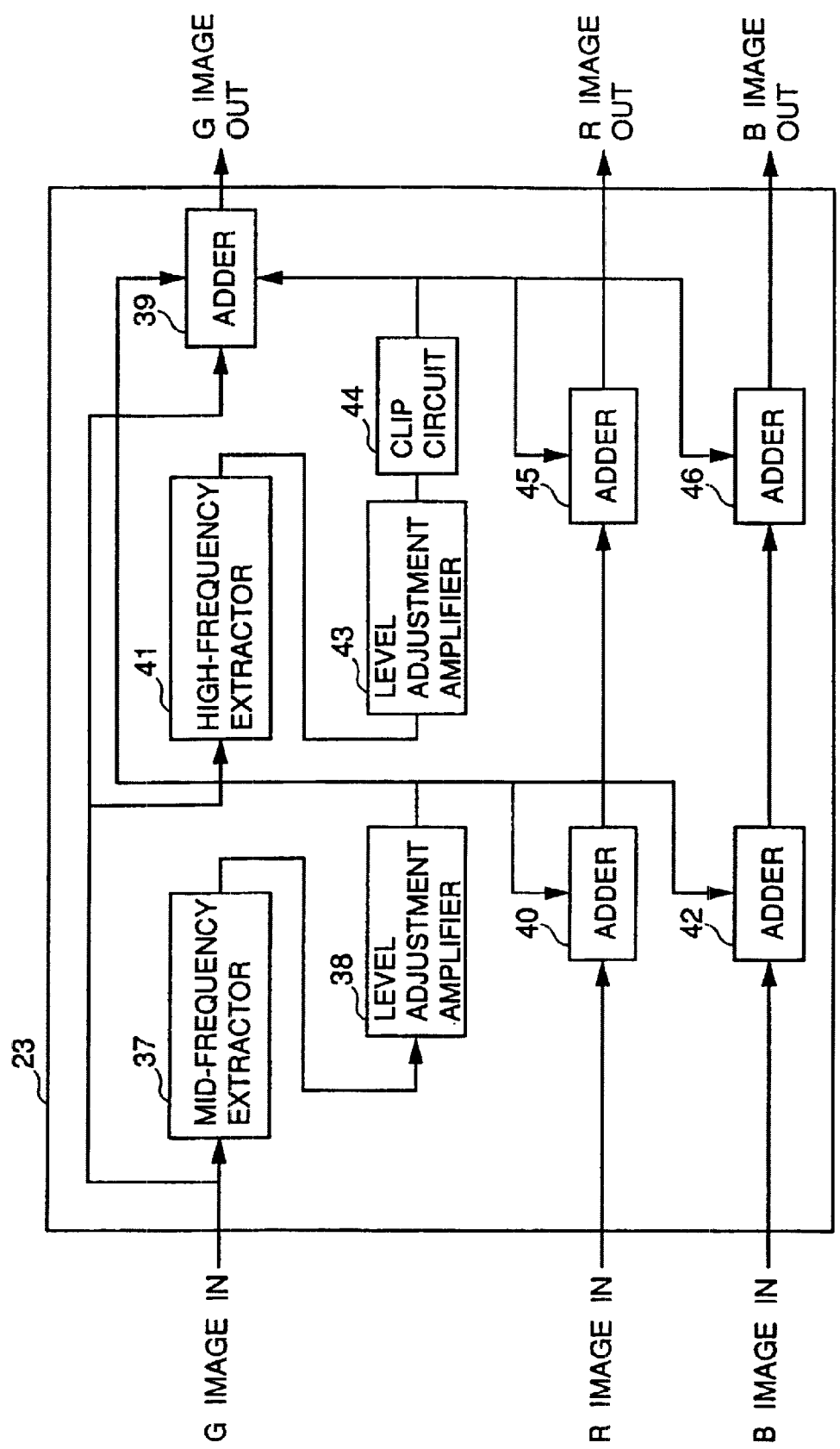
FIG. 9 is a block diagram illustrating the control performed by the bandwidth correction circuit.

FIG. 9 is a block diagram illustrating the control performed by the bandwidth correction circuit 23. The data of the G image is fed to a mid-frequency extractor 37, which extracts therefrom low-frequency signals by applying thereto the same bandwidth limits as for the R and B images by the use of a GL low-pass filter. The extracted low-frequency signals are subtracted from the original data to obtain mid-frequency signals. The original data of the G image is fed also to a high-frequency extractor 41, which extracts therefrom only high-frequency signals by the use of an enhancer filter.

The mid-frequency signals extracted by the mid-frequency extractor 37 are, after being subjected to level adjustment performed by a level adjustment amplifier 38, added to the data of each of the G, R, and B images in adders 39, 40, and 42 respectively. On the other hand, the high-frequency signals extracted by the high-frequency extractor 41 are, after being subjected to level adjustment performed by a level adjustment amplifier 43 and to base clipping performed by a clip circuit 44, added to the data of each of the G, R, and B images in adders 39, 45, and 46 respectively.

Thus, the bandwidth correction circuit 23 outputs the data of the image of each color after adding thereto the mid-frequency and high-frequency signals of the G image.

After bandwidth correction, the image signals are subjected to color balance control performed by a color balance control circuit 8. Color balance control refers to the process of achieving a proper balance of the chrominance signal of the video signal in accordance with the color temperature of the light from the object so that white will be reproduced appropriately as white. Specifically, the camera control CPU 16 calculates G/R and G/B from the R, G, and B data, fed from the colorimetiy sensor 21, of the entire light from the object, and thereby the correction gains for the data of the R and B images are determined. In accordance with these correction gains, the color balance control circuit 8 corrects the data of the R and B images.

Figure 10:
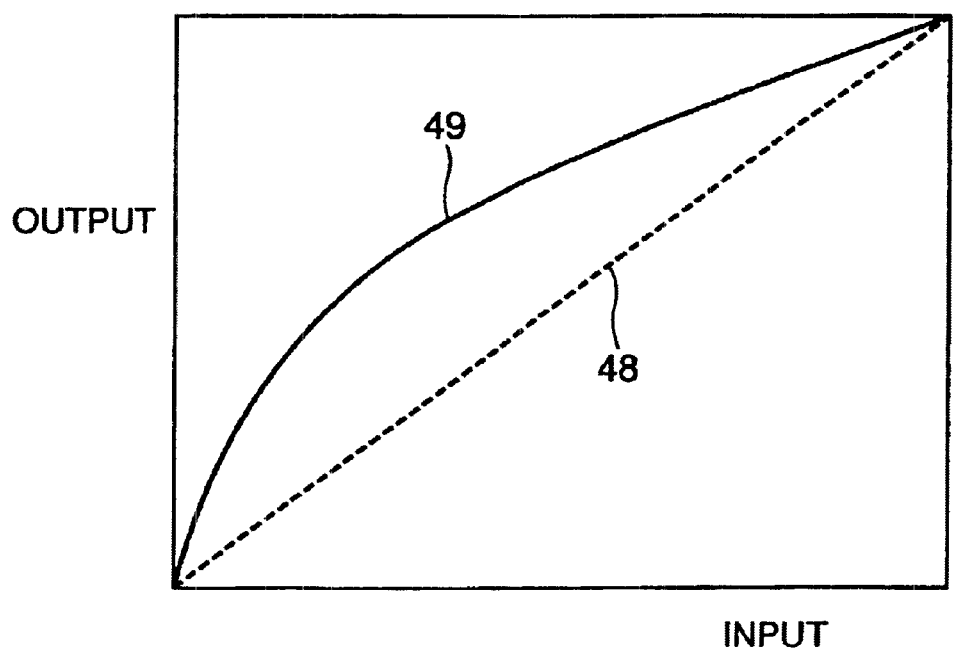
FIG. 10 is a diagram illustrating the relation between the levels of the input and output signals of the gamma correction circuit.

After color balance control, the image data of each color is subjected to gamma correction performed by the gamma correction circuit 9. The gamma correction circuit 9 performs non-linear conversion on the data of each color to obtain proper gradation appropriate for the CRT used. FIG. 10 illustrates an example of the signal level conversion performed by the gamma correction circuit 9. Without gamma correction, the relation between the input and output levels is as indicated by the broken line 48; with gamma correction, their relation is as indicated by the solid line 49. This correction helps achieve proper rendering of gradation in the image displayed on a monitor 18. The image data of the three images after gamma correction is stored in the image memory 20.

When the shutter button 17 is pressed halfway in (i.e. during previewing), the image data of the three images after the above-described series of image processing operations is read out from the image memory 20 and fed to a video encoder 11, where the image data is encoded in the NTSC/PAL format. Then, the image data of the three images is simultaneously fed to the built-in monitor 18. The image data is refreshed every predetermined frame period, and thereby a moving picture is displayed on the monitor 18. Note that previewing may be performed immediately when the power switch is turned on.

When the shutter button 17 is pressed fully in (i.e.. during actual shooting), the same sequence of operations as when the shutter button is pressed halfway in is performed, and the image data is fed to the monitor 18 for display. Simultaneously, the image data is compressed by an image compression circuit 10, and is then stored in a memory card by a memory card driver 12.

Note that, depending on the judgment that the crosstalk detection circuit 7 makes on the basis of the data obtained during previewing, the frequency of the read-operation clock signal of the image sensor 3 may be set at half the frequency used when the shutter button is pressed halfway in. Even in this case, exactly the same sequence of operations is performed in the image processing CPU 13, though the analog signal fed from the image sensor 3 to the A/D converter 6 then also has half the frequency it otherwise has.

Second Embodiment

FIG. 11 is a block diagram illustrating the structure of the image pickup apparatus of a second embodiment of the present invention. This image pickup apparatus differs from that of the first embodiment only in that it has a crosstalk elimination circuit 57 instead of the crosstalk detection circuit 7. In other respects, the two image pickup apparatuses have the same structure, and therefore overlapping explanations will not be repeated.

The image data stored in the image memory 20 is subjected to various kinds of image processing performed by the crosstalk elimination circuit 57, the pixel interpolation circuit 47, the bandwidth correction circuit 23, the color balance control circuit 8, and the gamma correction circuit 9, and is then written back to the image memory 20.

In the image pickup apparatus of the second embodiment, among the various kinds of image processing mentioned above, the image processing by the crosstalk elimination circuit 57 is performed first. Here, when noise exceeding a permissible level is likely to occur, filtering is performed; in such a way as to minimize the difference between the pixel-to-pixel signal level difference in one horizontal line and that in the next horizontal line.

Figure 12:
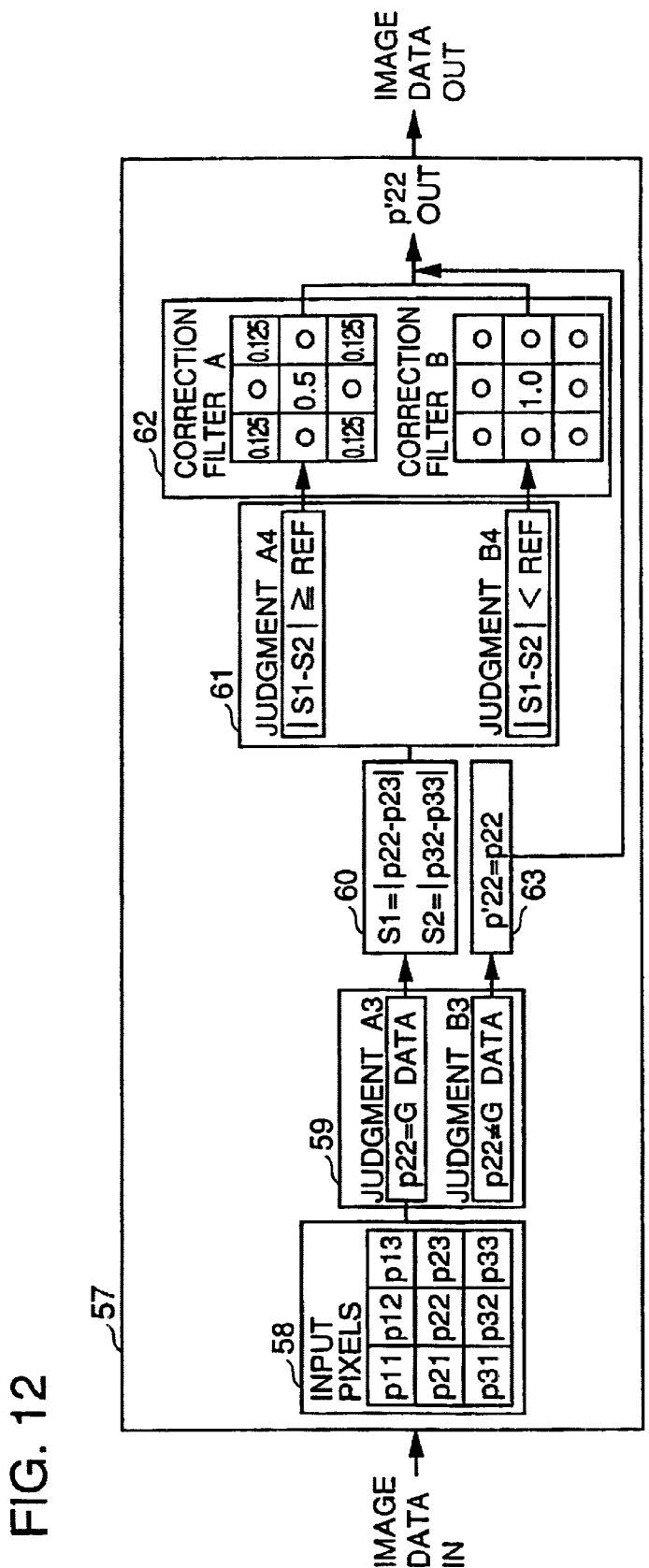
FIG. 12 is a flow chart illustrating the control performed by the crosstalk elimination circuit.

FIG. 12 is a flow chart illustrating the control performed by the crosstalk elimination circuit 57. First, in a data input step 58, the crosstalk elimination circuit 57 receives the data of one pixel (called the target pixel), together with the data of the eight pixels surrounding the target pixel, i.e., in total, the data of a set of 3×3 pixels including the target pixel at the center. Next, in a G-pixel extraction step 59, whether the data p22 of the central pixel is G-pixel data or not is checked.

If the data p22 is found not to be G-pixel data (judgment B3), then, since it is predicted that no noise due to crosstalk will occur, the data p22 is, without any correction, output as corrected data p'22=p22 in a corrected data output step 63. If the data p22 is found to be G-pixel data (judgment A3), then the control proceeds to a modulation factor calculation step 60, where the signal level differences S1 and S2 between adjacent pixels are calculated. Here, it is supposed that S1=|p22−p23| and |S2=p32−p33|.

Figure 13:
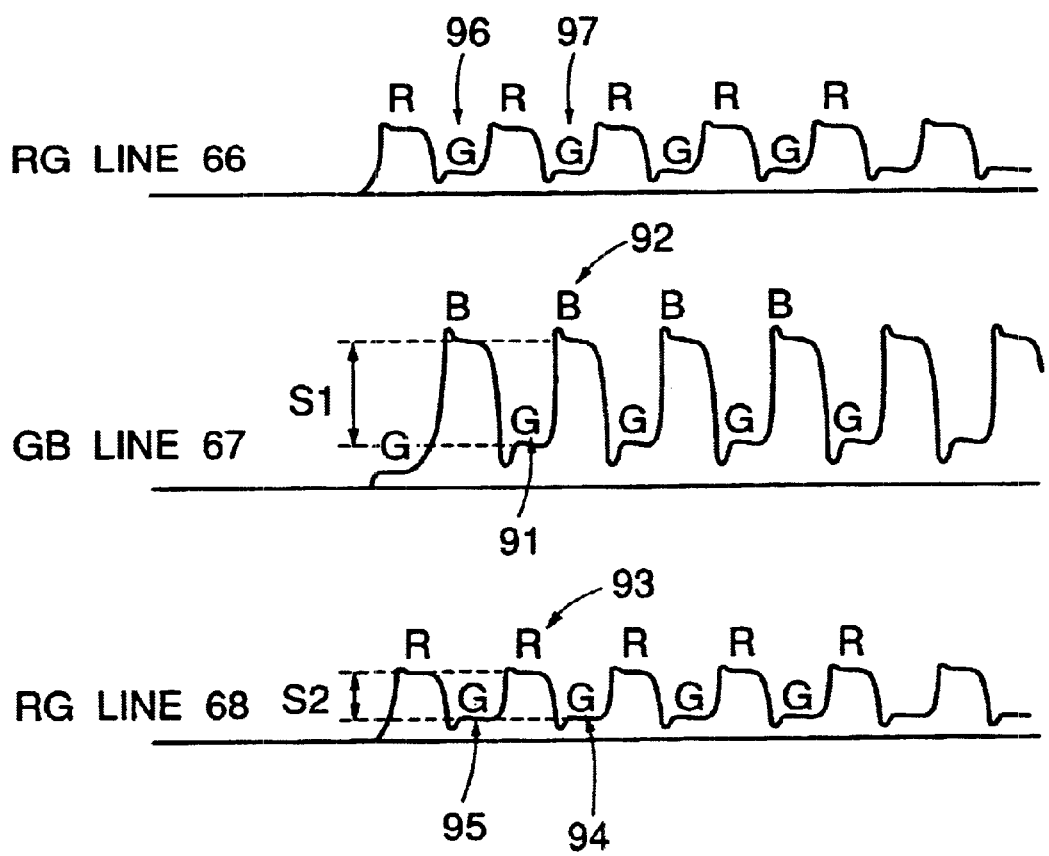
FIG. 13 is a diagram showing an example of image data illustrating the control performed by the crosstalk elimination circuit.

For example, suppose that the data p22 represents the signal level of a G pixel 91 as shown in FIG. 13, and that the data p23, p32, and p33 respectively represent a B pixel 92, an R pixel 93, and a G pixel 94. Then, as shown in FIG. 13, S1 represents the signal level difference between the G pixel 91 and the B pixel 92, and S2 represents the signal level difference between the R pixel 93 and the G pixel 94.

Back in FIG. 12, in the embodiment under discussion, the means used to calculate S1 is called a first subtracting means, and the means used to calculate S2 is called a second subtracting means. After the calculation of S1 and S2, the control proceeds to a judgment step 61, where a crosstalk reference level REF is previously set so that the central pixel can be classified depending on the values of S1 and S2. If |S1−S2|≧REF, then the central pixel is judged to deserve judgment A4; if |S1−S2|<REF, then the central pixel is judged to deserve judgment B4. When the central pixel is judged to deserve judgment A4, the difference between the pixel-to-pixel signal level difference in one horizontal line and that in the next horizontal line exceeds the predetermined level (REF), and therefore it is predicted that noise exceeding a permissible level will occur. Accordingly, to prevent noise, appropriate correction is performed in a correction step 62; that is, correction is performed by the use of a correction filter A. On the other hand, when the central pixel is judged to deserve judgment B4, it is predicted that no noise exceeding the permissible level will occur. Accordingly, no correction is performed in the correction step 62; that is, correction is performed by the use of a correction filter B.

Here, correction performed by the use of a correction filter involves multiplying all the signal values within the 3×3 pixels individually by predetermined coefficients equal to the values of the corresponding pixels of the filter, then adding up all the obtained values, and then using the resulting sum as the data p'22 of the central pixel after correction. Specifically, when the correction filter A is used, p'22=0.125=p11+0.125×p13+0.5×p22+0.125×p31+0.125×p33.

After such correction, for example as shown in FIG. 13, the signal level of the G pixel 91 approaches the signal levels of the G pixels 94, 95, 96, and 97. Note that, unless there is a border between different colors on the object, the signal levels of the G pixels are almost equal on two lines adjacent to one line as shown in FIG. 13 (in the case shown in FIG. 13, on two RG lines 66 and 68 adjacent to a GB line 67). This is because the G pixels are affected to an almost equal degree on these two lines. Thus, the correction performed by the use of the correction filter A helps reduce the difference in the signal level of the G pixels between adjacent lines.

As the difference in the signal level of the G pixels between adjacent lines becomes smaller, the difference between the signal levels of adjacent G pixels, as appears when the G pixels are subjected to pixel interpolation, becomes smaller. This helps reduce noise. In addition, even in cases where no pixel interpolation is performed, the difference between the signal levels of G pixels that should theoretically have equal levels becomes smaller. This also helps reduce noise.

When the correction filter B is used, p'22=p22, and the thus calculated data p'22 is output as the data p22 after correction. The sequence of operations described above is repeated successively for one pixel after another.

On completion of the processing by the crosstalk elimination circuit 57, the image data is then subjected to the same processing as in the first embodiment, i.e. the processing performed by the pixel interpolation circuit 47, the bandwidth correction circuit 23, the color balance control circuit 8, and the gamma correction circuit 9.

What is claimed is:

1. An image pickup apparatus comprising:
   an image sensor having first-type, second-type, and third-type pixels each producing a signal corresponding to a first, a second, and a third color respectively, the pixels being arranged in a two dimensional array comprising first-type lines and second-type lines arranged alternately, the first-type lines each comprising first-type and second-type pixels arranged alternately, the second-type lines each comprising first-type and third-type pixels arranged alternately;
   a first subtracter for calculating a difference between an output of one of the first-type pixels and an output of one of the second-type pixels on thee first-type lines, wherein the one of the first-type pixels is adjacent the one of the second-type pixels;
   a second subtracter for calculating a difference between an output of another of the first-type pixels and an output of one of the third-type pixels on the second-type lines, wherein the another of the first-type pixels is adjacent the one of the third-type pixels; and
   a control circuit for driving the image sensor in accordance with the differences calculated by the fist and second subtracters.

2. An image pickup apparatus as claimed in claim 1, wherein the control circuit controls a read-operation clock signal of the image sensor.

3. An image pickup apparatus as claimed in claim 2, wherein the control circuit controls the read-operation clock signal when a difference between absolute values of the outputs of the first and second subtracters is equal to or greater than a predetermined value.

4. An image pickup apparatus as claimed in claim 3, wherein the difference between the absolute values of the outputs of the first and second subtracters is calculated among outputs of four pixels that are adjacent to one another.

5. An image pickup apparatus as claimed in claim 4, wherein the control circuit controls the read-operation clock signal when there are more than a predetermined number of groups of four pixels among which the difference between the absolute values of the outputs of the first and second subtracters is equal to or greater than the predetermined value.

6. An image pickup apparatus as claimed in claim 2, wherein, whereas the first and second subtracters calculate the differences between the outputs of the pixels during previewing that is performed prior to actual shooting to monitor an image to be shot, the control circuit controls the read-operation clock signal of the image sensor during actual shooting.

7. An image pickup apparatus as claimed in claim 6, wherein the control circuit controls the read-operation clock signal of the image sensor in such a way that the clock signal has a lower rate during actual shooting than during previewing.

8. An image pickup apparatus as claimed in claim 1, further comprising:
   a color temperature detecting circuit for detecting a color temperature of light coming from an object to be shot,
   wherein the control circuit controls a read-operation clock signal of the image sensor in accordance with results of detection performed by the color temperature detecting circuit.

9. An image pickup apparatus comprising:
   an image sensor having first-type, second-type, and third-type pixels each producing a signal corresponding to a first, a second, and a third color respectively, the pixels being arranged in a two-dimensional array consisting of first-type lines and second-type lines arranged alternately, the first-type lines each consisting of first-type and second-type pixels arranged alternately, the second-type lines each consisting of first-type and third-type pixels arranged alternately;
   a color temperature detecting circuit for detecting a color temperature of light coming from an object to be shot; and
   a control circuit for driving the image sensor in accordance with an output of the color temperature detecting circuit;
   wherein, whereas the color temperature detecting circuit detects the color temperature during previewing that is performed prior to actual shooting to monitor an image to be shot, the control circuit controls a read-operation clock signal of the image sensor during actual shooting.

10. An image pickup apparatus as claimed in claim 9, wherein the control circuit controls the read-operation clock signal when the detected color temperature is not within a predetermined range.

11. An image pickup apparatus as claimed in claim 9, wherein the control circuit controls the read-operation clock signal of the image sensor in such a way that the clock signal has a lower rate during actual shooting than during previewing.

12. A method of reproducing an image by using:

an image sensor having first-type, second-type, and third-type pixels each producing a signal corresponding to a first, a second, and a third color respectively, the pixels being arranged in a two-dimensional array comprising first-type lines and second-type lines arranged alternately, the first-type lines each comprising first-type and second-type pixels arranged alternately, the second-type lines each comprising first-type and third-type pixels arranged alternately, comprising the steps of:
  calculating a difference between an output of one of the first-type pixels and an output of one of the second-type pixels on the first-type lines, wherein the one of the first-type pixels is adjacent the one of the second-type pixels;
  calculating a difference between an output of another of the first-type pixels and an output of one of the third-type pixels on the second-type lines, wherein the another of the first-type pixels is adjacent the one of the third-type pixels; and
  driving the image sensor in accordance with the calculated two differences.

13. A method of reproducing an image as claimed in claim 12, further comprising the steps of:
  previewing an image to be shot prior to actual shooting;
  calculating the two differences by using the outputs of the pixels during previewing; and
  controlling a read-operation clock signal of the image sensor in accordance with the calculated two differences during actual shooting.

14. A method of reproducing an image as claimed in claim 13,
  wherein the two differences are calculated among four pixels that are adjacent to one another.

15. A method of reproducing an image by using:

an image sensor having first-type, second-type, and third-type pixels each producing a signal corresponding to a first, a second, and a third color respectively, the pixels being arranged in a two-dimensional array consisting of first-type lines and second-type lines arranged alternately, the first-type lines each consisting of first-type and second-type pixels arranged alternately, the second-type lines each consisting of first-type and third-type pixels arranged alternately, comprising the steps of:
  detecting a color temperature of light coming from an object to be shot; driving the image sensor in accordance with the detected color temperature
  previewing an image to be shot prior to actual shooting;
  detecting the color temperature during previewing; and
  controlling a read-operation clock signal of the image sensor in accordance with the detected color temperature during actual shooting.

* * * * *